United States Patent

Moser et al.

[15] 3,693,680
[45] Sept. 26, 1972

[54] TREE HARVESTER DRIVE ARRANGEMENT

[72] Inventors: Raymond L. Moser, Tremont, Ill.; Max J. Teasdale, Waterloo, Belgium

[73] Assignee: Caterpillar Tractor Co., Peoria, Ill.

[22] Filed: June 7, 1971

[21] Appl. No.: 150,525

[52] U.S. Cl. ............................................. 144/3 D
[51] Int. Cl. .............................................. A01g 23/02
[58] Field of Search ....... 144/2 Z, 3 D, 34 R, 309 AC

[56] References Cited

UNITED STATES PATENTS 3,550,653   12/1970   Gauthier.....................144/3 D Primary Examiner—Gerald A. Dost
Attorney—Fryer, Tjensvold, Feix, Phillips & Lempio

[57] ABSTRACT

A tree harvesting machine including a processing implement, clamping and drive mechanisms for respectively securing a tree in proper alignment and propelling the tree past the processing implement, a rotary motor for operating the drive means and a speed reducing assembly for coupling the motor with the drive means, a flywheel being arranged for rotation with the motor to assist the motor in meeting peak torque demands of the drive means and maintaining generally constant operation of the harvesting machine. In another embodiment, a hydraulically actuated clutch engages the flywheel with an output shaft of the motor in response to a fluid supply with also operates the motor so that the flywheel is permitted to freewheel when the motor is not operating.

16 Claims, 5 Drawing Figures

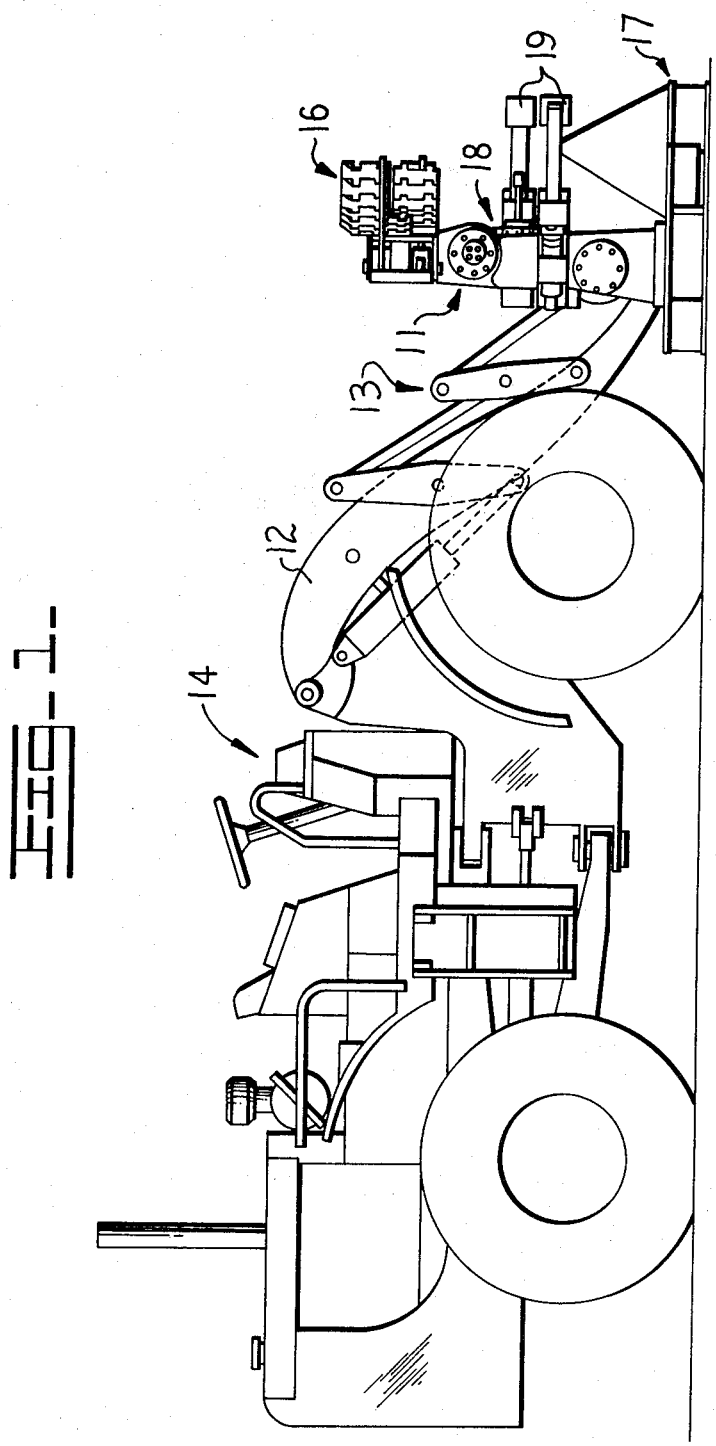

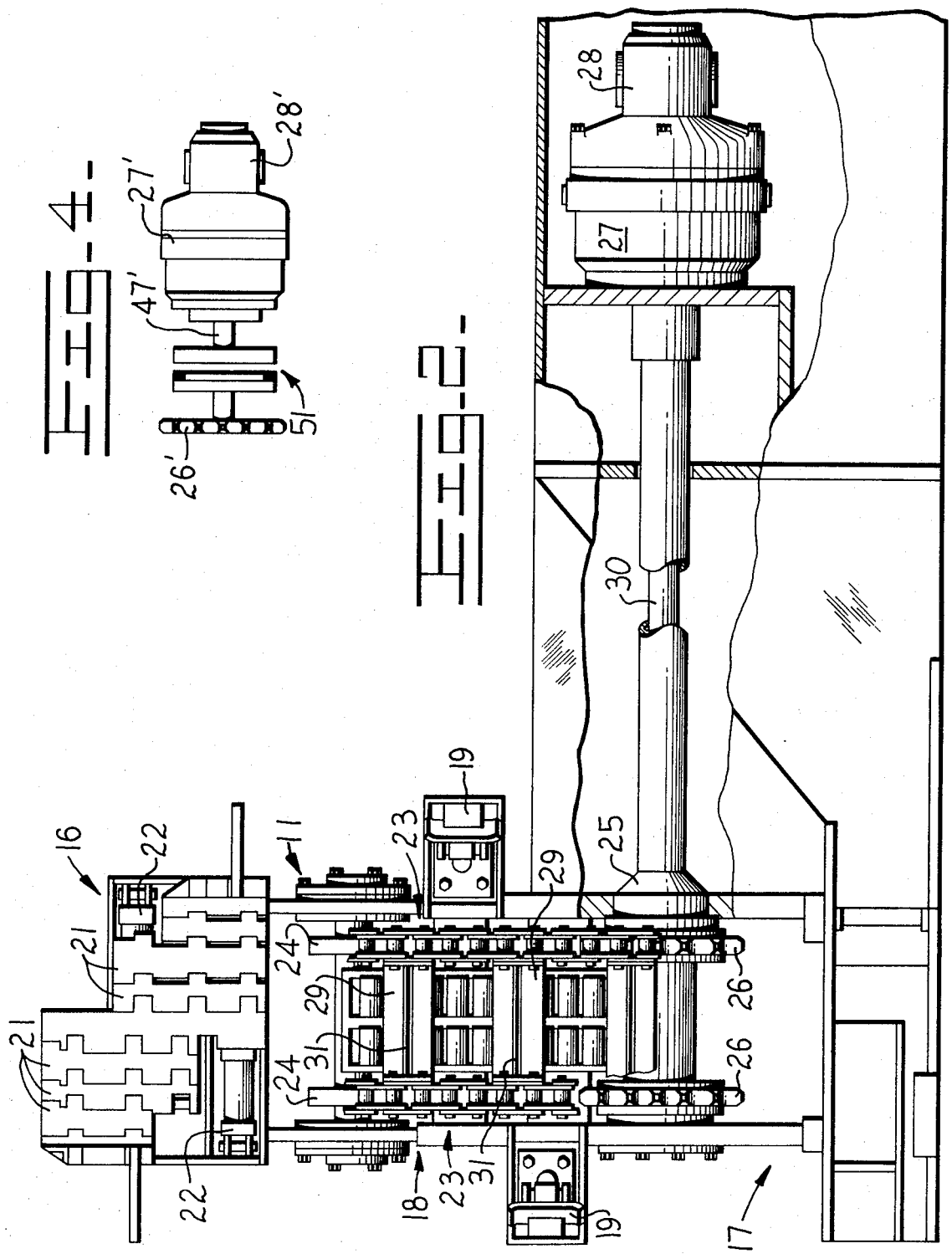

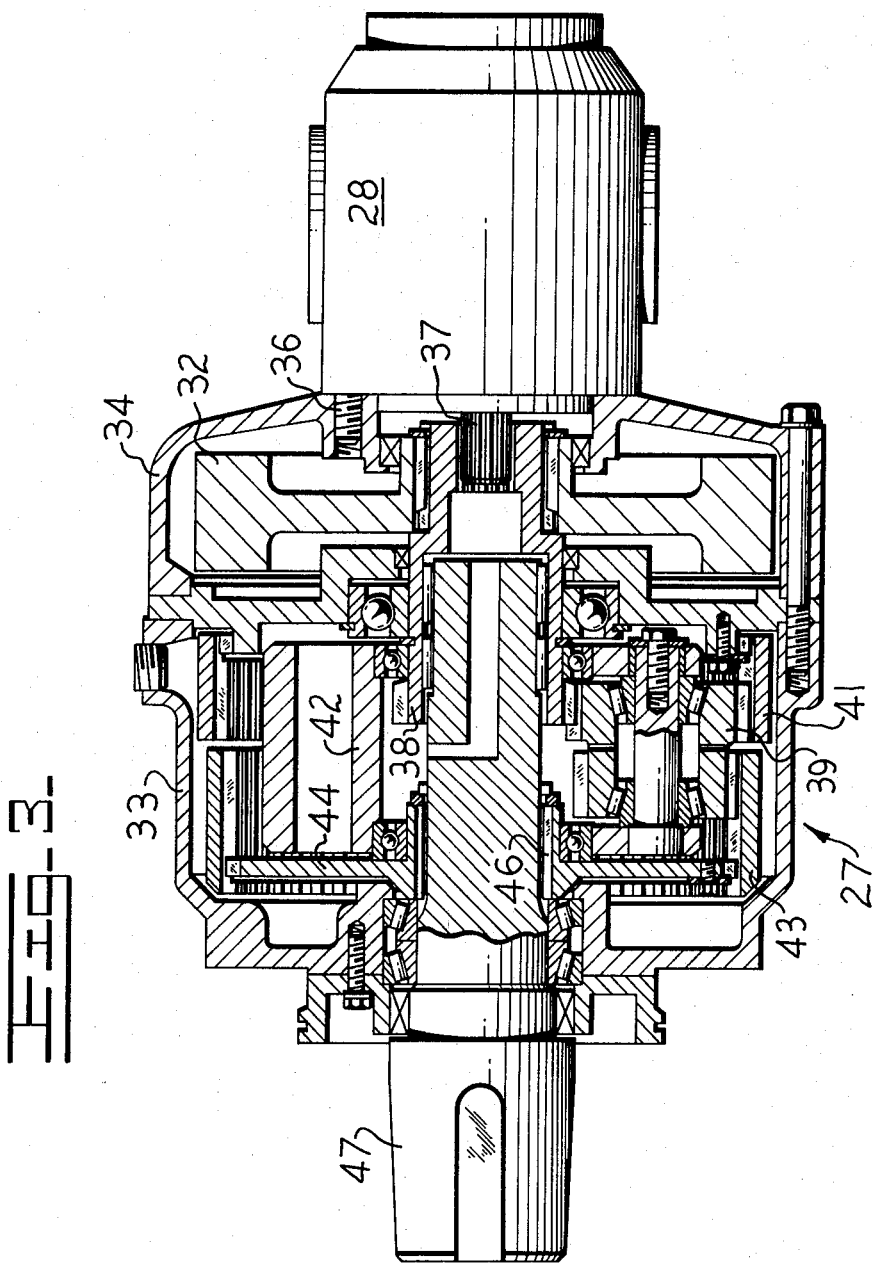

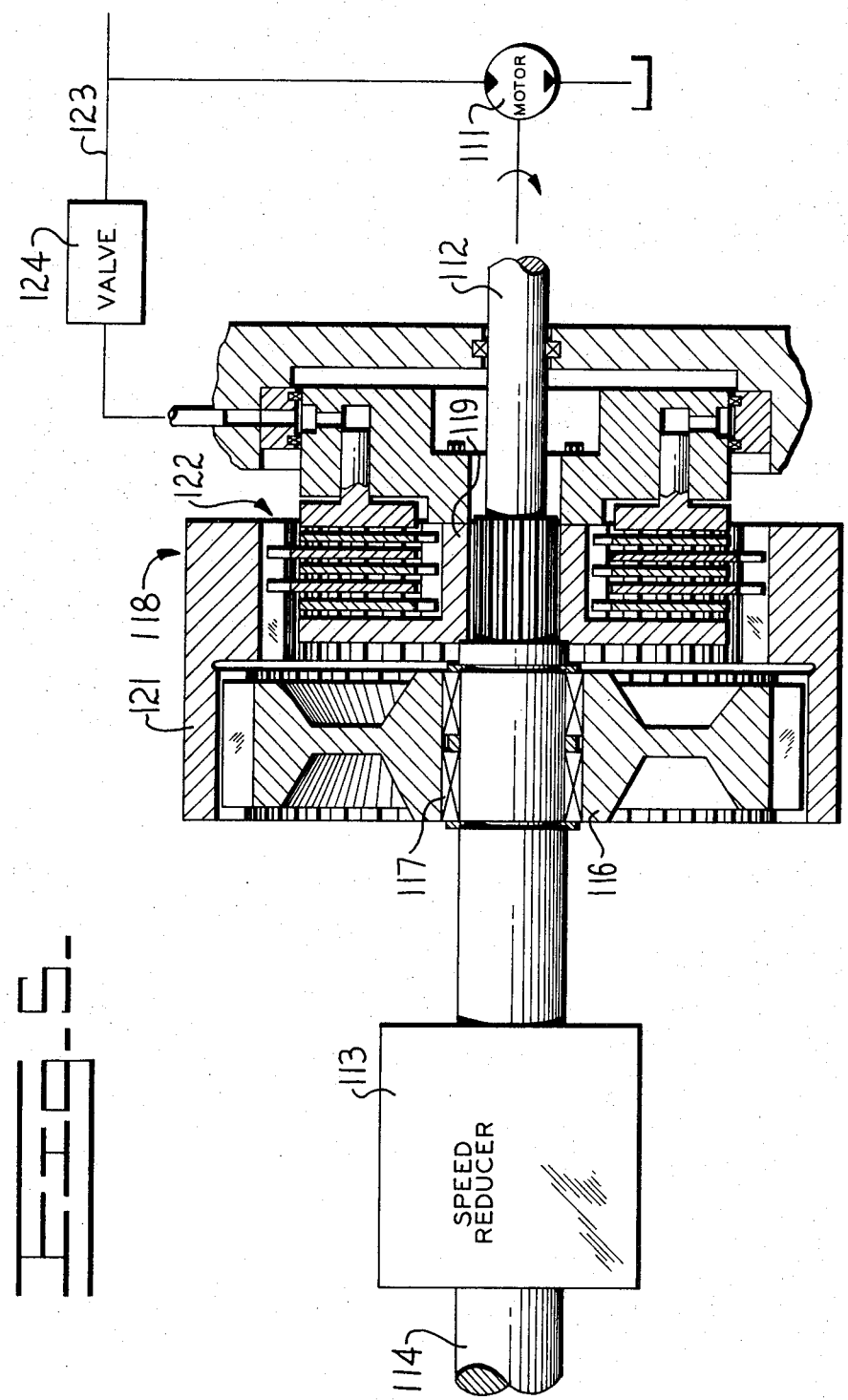

TREE HARVESTER DRIVE ARRANGEMENT

RELATED REFERENCES

The present invention is described in particular reference to a tree harvester drive arrangement which is described in greater detail in U.S. Pat. Ser. No. 58,465, entitled "Drive Mechanism for Tree Harvesters," filed on July 27, 1970 by Nathan Gutman et al.

The present invention relates to a tree harvester drive arrangement and more particularly to such an arrangement wherein an inertia mass or flywheel is rotatable with a drive motor to assist in sustaining operation of the tree harvester during peak torque demands and increased operating efficiency.

Tree harvesters commonly include one or more processing implements with drive means for propelling a tree past the implement in order to process the tree. The processing implement may be a delimbing mechanism including, for example, blade elements which are arranged about the circumference of the tree. The tree is then propelled through or past the delimbing mechanism with the blades removing limbs or other protrusions from the tree. Since the blades remove the limbs by impact, the drive mechanism experiences widely fluctuating torque demands as it propels the tree through the delimber.

In the prior art, relatively oversized motors have generally been employed for operating the drive mechanism in order to assure sustained motion of the tree past the processing implement. The use of such oversized motors tends to undesirably increase the costs for the tree harvester. In addition, the widely fluctuating torque demands may tend to cause damage within the motor or its operating circuit. For example, fluctuating torque demands in a rotary hydraulic motor tend to cause pressure surges in the hydraulic system for the motor which in turn may lead to damage of the motor or the valves and other components of the hydraulic system.

It is accordingly an object of the present invention to provide a drive arrangement for such tree harvesters including a motor and an inertia mass arranged for rotation with the motor to assist in sustaining operation of the tree harvester during peak torque demands. In addition, to maintaining steady continuous operation of the harvester drive arrangement, the present invention also tends to reduce the possibility of damage within the motor and its operating circuit.

It is a further object of the present invention to couple the motor with drive means of the tree harvester through a speed reducing assembly with the inertia mass being arranged for rotation with the motor at a relatively higher speed to further enhance its effect on the drive arrangement.

It is a still further object of the invention to provide such a drive arrangement for use with a tree harvester including a vehicle and a movable frame, the processing implement and drive mechanism being arranged on the movable frame, the motor and inertia mass also being arranged on the movable frame in close association with the drive means.

It is also an object to employ a clutch for coupling the inertia mass to an output shaft of the motor. Preferably, the clutch is hydraulically actuated by a fluid supply for operating the motor. The inertia mass may therefore freewheel when the motor is not operating to reduce the amount of energy to again set the inertia mass in rotation. Such an arrangement also permits other drive components to be rapidly stopped without dissipating rotational energy stored in the inertia mass. This feature of the invention contributes substantially to operating efficiency, for example, when the harvester drive train is intermittently stopped during processing of a single tree. This manner of operation would be typical where a shear assembly on the harvester is employed to cut or buck trees into sections. When operating fluid is again supplied to the motor the freewheeling inertia mass may be more rapidly and more easily brought back up to operating speed.

Other objects and advantages of the present invention are made apparent in the following description having reference to the accompanying drawings.

BRIEF DESCRIPTION OF THE DRAWINGS

FIG. 1 is a side elevation view of a tree harvesting machine;

FIG. 2 is a fragmentary front view taken from the right side of FIG. 1 to more clearly illustrate a processing implement, drive means for propelling a tree past the processing implement and motor means for operating the drive means;

FIG. 3 is a sectioned view illustrating in detail the coupling between the motor means and the drive means of FIG. 2;

FIG. 4 illustrates another possible coupling arrangement between the motor means and the drive means; and FIG. 5 is a partially schematic representation of another embodiment of the drive arrangement of the present invention.

DETAILED DESCRIPTION OF THE INVENTION

A tree harvester of the type illustrated in FIG. 1 includes one embodiment of the present drive arrangement, the particular tree harvester of FIG. 1 being described in greater detail in the reference noted above. To briefly summarize its construction, a movable frame 11 is pivotably secured to the lift arms, one of which is indicated at 12, and tilt linkage 13 of a loader vehicle 14. Processing implements arranged upon the frame 11 include a delimbing mechanism 16 and a shear assembly 17. A drive mechanism 18 is arranged on the frame 11 in operating a alignment between the shear assembly 17 and the delimbing mechanism 16. Clamping arms 19 are also pivotally supported upon the frame 11 in order to maintain a tree in engagement with the drive mechanism 18 and in proper alignment with the processing implements on the frame, particularly the delimbing mechanism 16.

As may be best seen in FIG. 2, the delimbing mechanism 16 includes a plurality of blades 21 which are interconnected and may be placed in close contact with the circumference of a tree by means of hydraulic jacks indicated at 22.

The drive mechanism 18 includes a pair of chains 23 entrained about idlers 24 and drive sprockets 26. The drive sprockets 26 are coupled in driven relation with a gear reduction assembly 27 and a drive motor 28. A plurality of flights 29 are interconnected in spaced apart relation between the chains 23, each flight including a sharpened blade 31 for penetrating the tree and maintaining driving engagement between the drive mechanism and the tree.

A chain-drive coupling 25 and torque tube drive shaft 30 connect the motor 28 and reducer 27 with the drive mechanism. The torque tube also assists the motor in operating the drive mechanism when substantial resistance is momentarily encountered by the drive mechanism. The chain-drive coupling compensates for misalignment between the motor and drive mechanism.

In operation, the tree harvesting machine is positioned to receive a standing tree in proper alignment with the delimbing mechanism 16, the shear assembly 17 and the drive mechanism 18. The clamping arms 19 secure the tree in place with the shear assembly 17 being operated to sever the standing tree. The tree is then rotated into a generally horizontal position along with the frame 11 by means of the tilt linkage 13. The drive mechanism 18 is set in rotation by the drive motor 28 to propel the tree through the delimbing mechanism 16 for removing limbs and other protrusions from the tree.

Referring now to FIG. 3, a rotatable inertia mass preferably a flywheel indicated at 32, is arranged for rotation with the motor 28 to assist the motor in overcoming peak torque demands of the harvester drive arrangement occurring particularly as a result of the delimbing process described above. Rotation of the flywheel at the relatively higher operating speed of the motor 28 tends to assist in maintaining a more uniform operating speed for the drive mechanism 18 (See FIG. 2) while overcoming peak torque demands which might otherwise tend to stall the motor 28 and cause damage to the motor or its operating circuit (not shown). In this regard, the motor 28 is preferably a hydraulic motor having a conventional hydraulic control circuit although the motor might also be an electrical motor having an electrical control circuit for example.

The gear reduction assembly 27 is arranged within a housing 33 and the flywheel 32 is arranged for rotation within a housing portion 34 which may be integrally secured to the gear reduction housing 33.

The hydraulic motor 28 is secured to the housing portion 34, for example, by screws such as that indicated at 36, with an output shaft 37 of the motor being coupled with a planetary sun gear 38 of the gear reduction assembly 27. The sun gear 38 meshes with a plurality of planet gears, one of which is indicated at 39, which in turn mesh with a stationary ring gear 41 secured to the housing 33. Upon rotation of the sun gear 38, a planet carrier 42 is driven in the same direction as the sun gear but at a reduced speed. The planet gear 41 also meshes with a ring gear 43 which is splined to a plate 44. The plate 44 is connected by another spline 46 with an output shaft 47 to which the drive sprockets 26 (See FIG. 2) are coupled. Thus, the output shaft 47 of the gear reduction assembly rotates in the same direction as the output shaft 37 of the motor 28 but at a considerably reduced speed and increased torque. As noted above, the flywheel 32 rotates at the relatively higher speed of the motor 28 and output shaft 37 rather than with the gear reduction output shaft 47 so that its effect on operation of the drive arrangement is further enhanced.

Another arrangement for coupling the drive motor with the drive mechanism 18 of FIG. 2 is illustrated in FIG. 4. A similar drive motor is indicated at 28' coupled with a gear reduction assembly 27' which also includes a rotatable flywheel as illustrated in FIG. 3 and described above. The gear reduction assembly 27' has an output shaft 47' for coupling with the drive mechanism which is illustrated by one of the drive sprockets 26'. In this arrangement, a clutch 51 is employed for selectively coupling and uncoupling the drive motor 28' and gear reduction assembly 27' from the drive mechanism.

Referring again to FIG. 1, the shear assembly 17 may be used during processing of a tree to cut the tree into sections of selected length. For such a sectioning operation, it is necessary to momentarily stop the tree to permit operation of the shear. The clutch 51 permits the motor 28' to be uncoupled from the drive mechanism during such a momentary stop so that the motor 28' and the associated flywheel (See FIG. 2) may continue in rotation during the sectioning operation and then be recoupled with the drive mechanism to continue propelling the tree through the delimbing mechanism 16. Use of the clutch 51 makes it unnecessary for the motor 28' to again set the flywheel in motion after operation of the drive mechanism 18 has been temporarily interrupted. Other tree harvesting implements may also require momentary stopping of the tree so that the clutch 51 could also be effectively used in conjunction with such other processing implements.

Another embodiment is illustrated in FIG. 5 and except for the features described, it may otherwise be similar to the embodiment described above with reference to FIGS. 1–3.

Referring now to FIG. 5 a hydraulic motor 111 is coupled through an output shaft 112, a speed reducer gear box 113 and another shaft 114 with a drive mechanism for a tree harvester of the type illustrated in FIGS. 1–3 and described above. A flywheel 116 is supported on the output shaft 112 by bearing means 117.

The flywheel 116 is selectively associated for rotation with the output shaft 112 by means of a hydraulically actuated clutch 118. One portion 119 of the clutch is splined to the output shaft 112. Another portion 121 of the clutch encircles the flywheel in splined relation so that it is in effect a portion of the inertia mass comprising the flywheel. Alternate clutch discs 122 are respectively secured to the two clutch portions.

A supply of hydraulic fluid under pressure is delivered to the motor 111 through a branched conduit 123 with conventional control valving (not shown) regulating the delivery of fluid through the conduit and thereby controlling operation of the motor 111.

Fluid for actuating the clutch 118 and causing firm coupling of the flywheel with the output shaft 112 is also delivered through the branched conduit 123. The clutch is therefore actuated during operation of the motor 111 and otherwise permits freewheeling of the flywheel. As noted above, this permits more rapid stopping of the drive mechanism free of stress which would otherwise be caused by the flywheel while reducing the amount of energy necessary to set the flywheel in rotation when the motor again commences operation.

A valve 124 may also be arranged along the branched conduit 123 to selectively block fluid delivery to the clutch while not affecting fluid communication with the motor. Thus, an operator of a tree harvester with which the present drive arrangement is associated may operate the motor with or without actuation of the clutch and association of the flywheel with the output shaft 112.

The flywheel may not be required during all phases of tree harvester operation, for example, during the processing of small trees or trees with small limbs to be removed or only a small number of limbs. By selective operation of the valve 124, the operator may, for example, engage the clutch to cause rotation of the flywheel upon observing a relatively large limb to be severed. Engagement of the flywheel also causes a momentary pressure surge in the hydraulic drive circuit for the harvester which has the added advantage of urging the grapple arms and delimber into tighter engagement with the tree to reduce slippage between the tree and drive mechanism and assure proper delimbing of the tree.

What is claimed is:

1. A tree harvesting machine, comprising
    a processing implement;
    a drive and clamping mechanism arranged in operating alignment with the implement, the mechanism including drive means and clamping means for maintaining a tree in engagement with the drive means and in alignment with the implement, the drive means being operable to propel the tree past the processing implement,
    motor means for operating the drive means in rotation, the motor means having output shaft,
    speed reducing means coupling the output shaft of the motor means with the drive means, and
    an inertia mass arranged for rotation with the output shaft of the motor means to assist the motor means in sustaining operation of the drive means during peak torque demands.

2. The machine of claim 1 wherein the processing implement is a delimbing mechanism.

3. The machine of claim 1 wherein the motor means is a hydraulic motor.

4. The machine of claim 1 further comprising an elongated frame pivotably supported on a vehicle, the processing implement and drive and clamping mechanism being arranged in operating alignment on the frame.

5. The machine of claim 4 wherein the processing implement is a delimbing mechanism, a shear assembly also being arranged on the frame.

6. The machine of claim 4 wherein the speed reducing means and motor means are arranged on the frame adjacent the drive means, the speed reducing means comprising a planetary gear set having a sun gear coupled to the output shaft of the motor means and a ring gear effectively coupled with the drive means, the inertia mass being coupled for rotation with the sun gear.

7. The machine of claim 6 wherein the inertia mass is a flywheel and the motor means is a reversible hydraulic motor.

8. The machine of claim 1 wherein the inertia mass is a flywheel.

9. The machine of claim 8 wherein the processing implement is a delimbing mechanism having blade means for impact removal of limbs from the tree, the drive means including endless chain means for engaging the tree and a drive sprocket about which the chain means is entrained, the drive sprocket being coupled with the motor means through the speed reducing means.

10. The machine of claim 9 wherein the motor means is a hydraulic motor and the speed reducing means comprises a planetary gear set.

11. The machine of claim 1 further comprising clutch means effectively coupled with the inertia means to permit disengagement of the inertia mass from the drive means when the drive means is momentarily stopped.

12. The machine of claim 11 wherein the inertia mass is a flywheel, the speed reducing means comprises a planetary gear set for coupling the drive means with the motor means output shaft and flywheel, the clutch means being arranged on one side of the planetary gear set, the processing implement being a delimbing mechanism, a shear assembly also being arranged in operable alignment with the delimbing mechanism and drive means.

13. The machine of claim 1 further comprising a clutch being actuatable in common with the motor means for coupling the inertia mass with the output shaft of the motor means.

14. The machine of claim 13 wherein the clutch is hydraulically actuatable and the motor means is a hydraulic motor, a common supply of fluid under pressure being in communication with both the clutch and motor.

15. The machine of claim 14 further comprising a valve associated with the clutch for selectively blocking fluid supply to the clutch.

16. The machine of claim 13 wherein the inertia mass is a flywheel mounted on the output shaft of the motor means by bearing means, the clutch comprising one portion coupled with the flywheel, one portion coupled with the output shaft of the motor means and actuating means for selectively engaging the two clutch portions and causing rotation of the flywheel with the output shaft of the motor means.

* * * * *